US006898901B2

(12) United States Patent
Petroski et al.

(10) Patent No.: US 6,898,901 B2
(45) Date of Patent: May 31, 2005

(54) SOUND-ABSORBING COMPOSITES AND SHIELD DEVICES EMPLOYING SAME

(75) Inventors: John A. Petroski, Ravenna, OH (US); Robert A. Isaksen, Chardon, OH (US); Wallace R. Jones, Concord Township, Lake County, OH (US)

(73) Assignee: The XLO Group of Companies, Inc., Cleveland, OH (US)

( * ) Notice: Subject to any disclaimer, the term of this patent is extended or adjusted under 35 U.S.C. 154(b) by 161 days.

(21) Appl. No.: 10/080,204

(22) Filed: Feb. 21, 2002

(65) Prior Publication Data

US 2002/0170235 A1 Nov. 21, 2002

Related U.S. Application Data

(60) Provisional application No. 60/270,961, filed on Feb. 22, 2001.

(51) Int. Cl.[7] .................................................. B60J 5/04
(52) U.S. Cl. ..................................... 49/502; 296/146.5
(58) Field of Search ........................ 49/502; 296/146.5, 296/146.7; 428/71, 178, 215, 318.4, 319.3, 319.9, 343, 354

(56) References Cited

U.S. PATENT DOCUMENTS

| 4,696,848 | A | | 9/1987 | Jones et al. .................... 428/80 |
| 4,865,791 | A | | 9/1989 | Ferro et al. .................. 264/134 |
| 5,312,145 | A | * | 5/1994 | McNeil ...................... 293/128 |
| 5,560,967 | A | | 10/1996 | Isaksen ........................ 428/71 |
| 5,973,221 | A | * | 10/1999 | Collyer et al. ................ 602/46 |

* cited by examiner

*Primary Examiner*—Jerry Redman
(74) *Attorney, Agent, or Firm*—Fay, Sharpe, Fagan, Minnich & McKee, LLP

(57) ABSTRACT

A sound-absorbing shield device for use in a vehicle door comprises a sheet of sound-absorbing material and a thin sheet of polymer film. A first face of the polymer film is attached to the sound absorbing material and a plurality of apertures extending through the polymer film from the first face thereof to a second face thereof opposite the first face. Each aperture is bounded by a hollow protrusion extending from the second film face, whereby the apertures and protrusions cooperate to form a barrier against moisture or other environmental contamination while admitting acoustic energy therethrough into the sound absorbing material.

18 Claims, 4 Drawing Sheets

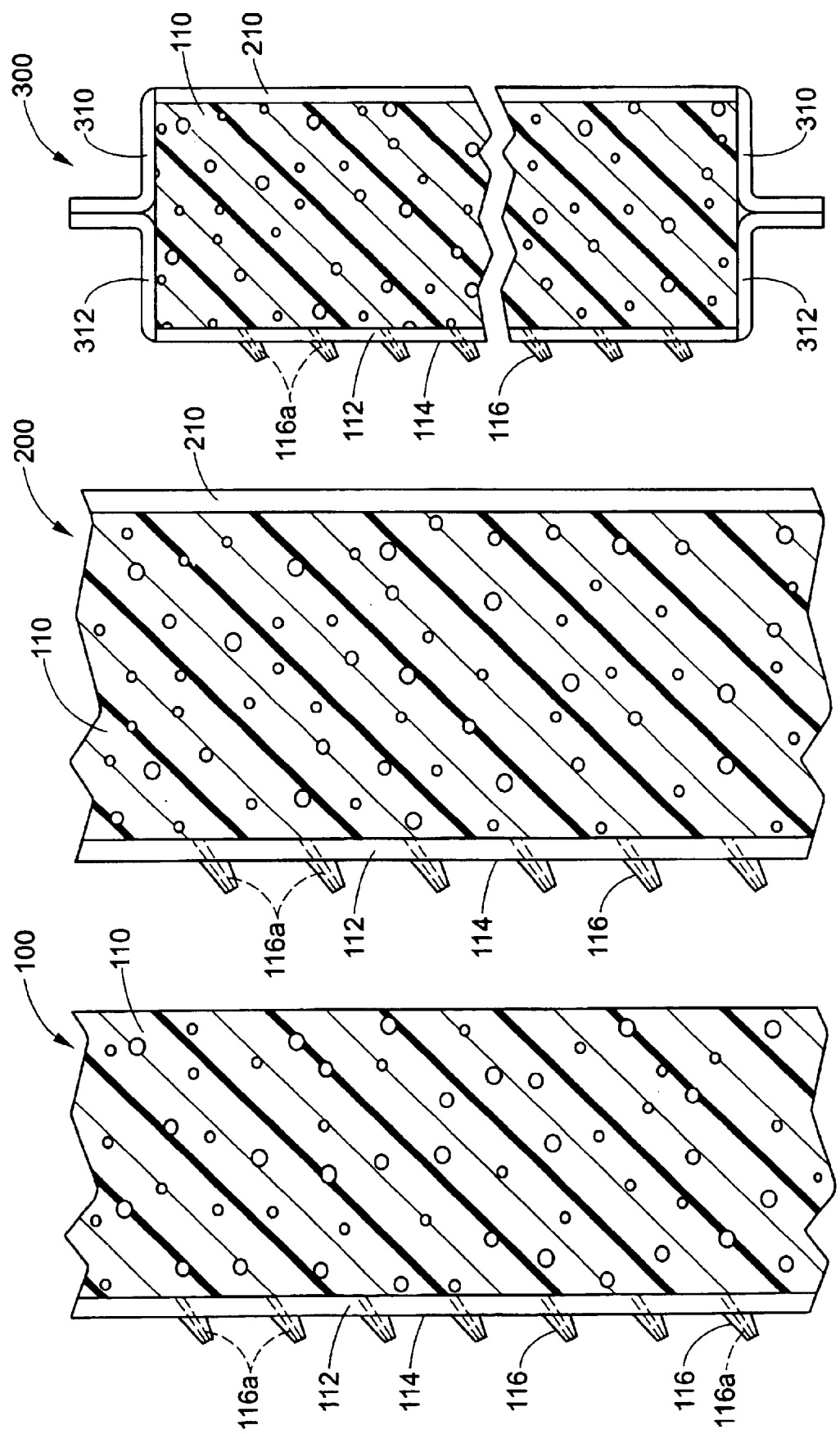

SOUND-ABSORBING COMPOSITES AND SHIELD DEVICES EMPLOYING SAME

RELATED APPLICATION

This application claims the benefit under 35 U.S.C. § 119(e) of U.S. provisional application Ser. No. 60/270,961, filed Feb. 22, 2001. The aforementioned application Ser. No. 60/270,961 is incorporated by reference in its entirety.

BACKGROUND OF THE INVENTION

The present invention is directed to acoustic composites or laminates useful in sound control. It finds particular application in conjunction with water deflectors, however, it will be appreciated that the invention finds utility in conjunction with all manner of sound control and/or moisture or environmental shielding.

Open-cell foams have proven useful in sound control. Acoustic energy enters the open-cell passages where it is trapped and absorbed. However, in a wet or hostile environment, the open cells become passages for water and other contaminants to penetrate the foam.

Water shields, deflectors, or protectors are commonly used in the automotive industry to protect inner door trim panels, as well as components mounted thereon, from being damaged by water entering the interior of the doors. Vehicle manufacturers have also been interested in achieving sound insulation through the use of such deflectors. One type of water deflector which has been in use for some time comprises a layer of closed cell polyethylene foam interposed between thin layers of polyethylene film. This sheet construction can be processed using standard techniques and performs satisfactorily in its water deflecting function; however, it does not contribute significantly in terms of sound insulating qualities.

While various material combinations have been proposed for use as sound insulating water deflectors, these combinations have typically had significant drawbacks in terms of cost and/or processing difficulties. For example, it is often desirable to provide the deflectors with variable thicknesses, e.g., having an increased thickness in regions where sound control is needed most and decreased thickness where assembly considerations require it. One technique is to compress the part with the application of heat and pressure to compact the foam in specific or predetermined areas. This technique has a number of drawbacks. The heat and pressure process is slow and expensive. Also, the foam in the compressed areas is still present and can cause problems such as wicking of water, particularly if the article is mispositioned during application. Furthermore, the compressed foam is opaque which creates assembly and handling problems. For example, the opacity makes it difficult to locate screws or other fasteners which must pass through the water deflector. The opacity also makes it difficult to verify adequacy of seal pressurization.

The present invention contemplates a new and improved sound-insulating water shield or deflector which overcomes the above-referenced problems and others.

SUMMARY OF THE INVENTION

The present invention provides a sound-absorbing water deflector sheet product which has improved sound-absorbing qualities. The sheet comprises a layer of sound-absorbing material and a layer of thin polymer film. A first face of the polymer film is bonded to a face of the sound-absorbing material. The layer of polymer film includes a plurality of apertures formed therein comprising a protrusion or boss having a perforated tip projecting from a second face of the polymer film disposed opposite the first face. The apertures or perforations admit the passage of acoustic energy into the foam material where it is absorbed while excluding water and other contaminants.

In a further aspect, a method of forming a shield device for use in an automobile door comprises providing a sheet of polymer film material and forming a plurality of perforations through the sheet of polymer film extending from a first face of the film to a second face thereof opposite the first face. Hollow protrusions are formed at the same time the perforations are formed, each protrusion bounding a perforation and extending away from the second face of the polymer film. The apertures and perforations cooperate to form a barrier against environmental contamination while increasing acoustic transparency of the film. The first side of the polymer film is attached to a sheet of sound absorbing material.

In yet another aspect, a method for sealing a vehicle door against sound and environmental contamination entering an interior compartment thereof includes providing a sealing system having a size and shape to generally conform to an opening in the inner door panel. The sealing system comprises a sheet of sound-absorbing material and a thin sheet of polymer film having a first face attached to a first face of the sound absorbing material. A plurality of apertures extend through the polymer film from the first face to a second face thereof opposite the first face and each aperture is bounded by a hollow protrusion extending from the second film face. The apertures and protrusions cooperate to form a barrier against environmental contamination while admitting acoustic energy therethrough. The a sealing system is then installed onto the vehicle door.

In another aspect, an improved vehicle door construction, of a type having an outer door panel and an inner door panel with a trim panel joined to the inner door panel and a shield device positioned between the trim panel and the inner door panel, is provided. The improvement comprises a shield device including a sheet of sound-absorbing material and a thin sheet of polymer film having an inboard facing surface attached to an outboard facing surface of the sound absorbing material. A plurality of openings extend through the polymer film from the inboard facing surface thereof to an opposite, outboard facing surface of the film, each opening being bounded by a hollow protrusion extending from the outboard facing film surface. The openings and protrusions cooperate to form a barrier against environmental contamination while admitting acoustic energy into the sound absorbing layer.

In yet a further aspect, an improved vehicle door construction, of a type having an outer door panel and an inner door panel with a trim panel joined to the inner door panel and a shield device positioned between the trim panel and the inner door panel, is provided. The improvement comprises a shield device including a sheet of sound-absorbing material having an outboard facing surface in acoustic communication with an outboard side of the vehicle door and an imperforate polymer film attached to an inboard facing surface of the sound absorbing material opposite the outboard facing surface.

One advantage of the present invention resides in its ability to efficiently pass sound into the foam, thus providing increased sound absorption, while effectively blocking water and other environmental contaminants.

Another advantage of the invention resides in the fact that foam can be readily removed from areas likely to cause wicking of moisture into the foam and that regions of variable foam thickness can be provided through such foam removal without the use of expensive and time consuming thermal compression techniques.

Yet another advantage is found in that regions of thin foam become near transparent, thus overcoming the above-mentioned problems of opacity.

Still further benefits and advantages of the present invention will become apparent to those of ordinary skill in the art upon reading and understanding the following detailed description of the preferred embodiments.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The following detailed description may be best understood when read in reference to the accompanying drawings wherein:

FIG. 1 is a side sectional view showing a sound absorbing water deflector sheet construction formed in accordance with a first embodiment of the subject invention;

FIG. 2 is a side sectional view showing a sound-absorbing water deflector sheet construction formed in accordance with a second embodiment of the subject invention;

FIG. 3 is a side sectional view showing a sound-absorbing water deflector sheet construction formed in accordance with a third embodiment of the subject invention;

DETAILED DESCRIPTION OF THE PREFERRED EMBODIMENTS

Figure 4:
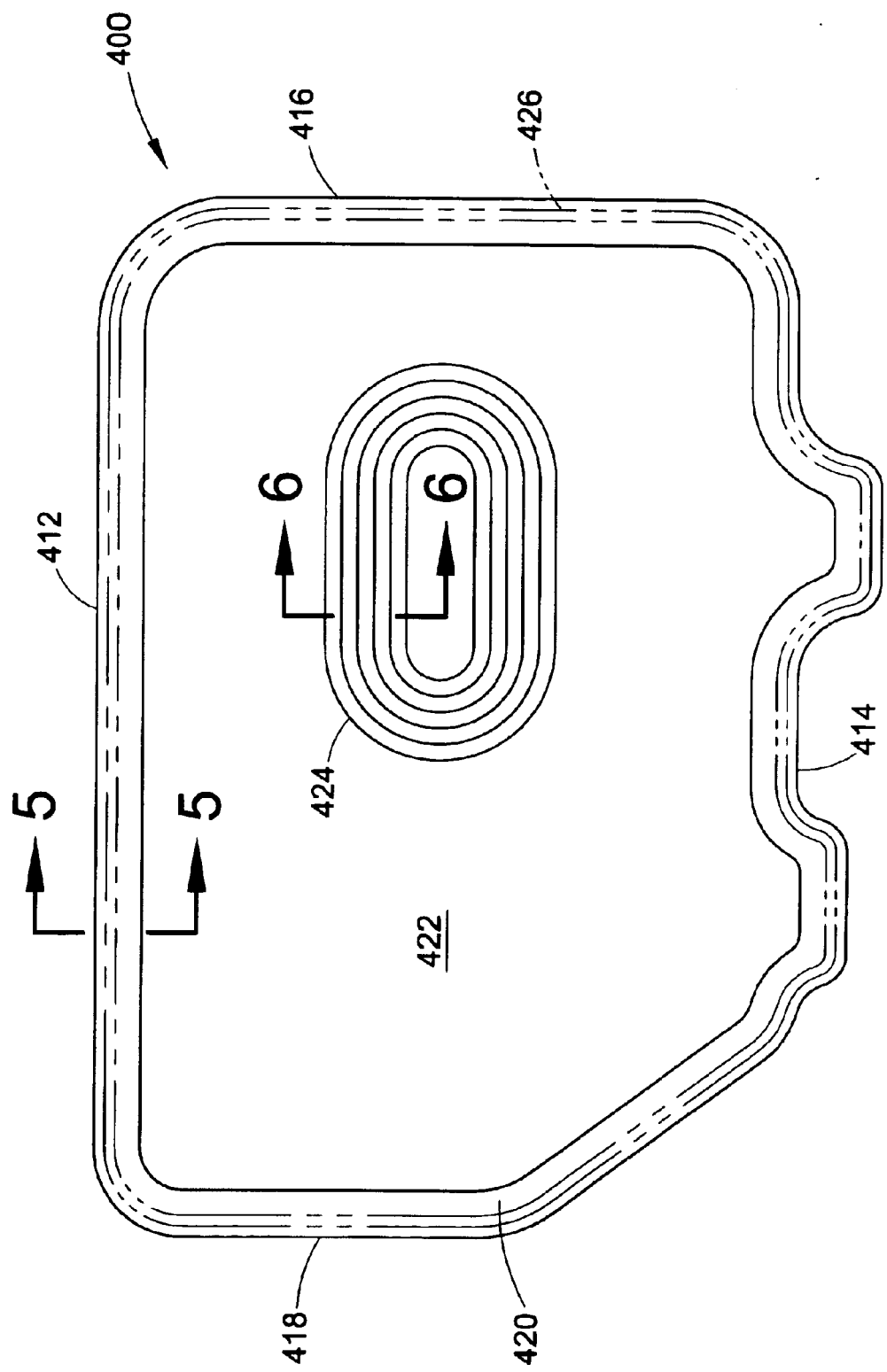
FIG. 4 is plan view showing an exemplary water deflector sheet construction formed in accordance with the subject invention.

FIG. 1 illustrates a composite or laminate article 100 formed in accordance with a first embodiment of the present invention suitable for use as a sound-absorbing water shield or deflector. The composite 100 includes a porous, energy absorbing foam layer 110 which is protected from water penetration by a film layer 112 that allows acoustic energy to pass while repelling or otherwise blocking the passage of water therethrough.

The foam layer is preferably a urethane foam, most preferably an ether-type urethane foam. Preferably, the foam has a thickness of at least about 5 mm, preferably about 10 mm. Additionally, although many different types of open- or closed-cell urethane foam could be used, the subject preferred form has a pore size of from about 8–32 cells/cm, preferably about 16 cells/cm, and a density of from about 20 to about 35 kg/m$^3$, preferably about 27 kg/m$^3$. Other acoustic energy absorbing materials include, but are not limited to, other open- or closed-cell polymeric foam materials, shoddy or fibrous insulation materials such as cotton, fiberglass, nonwoven synthetic fibers, and the like.

The film layer 112 is a polymer film, such as a thermoplastic film, such as polyethylene, polypropylene, polyvinyl chloride, and copolymers thereof. The film material is preferably polyethylene, such as linear low density polyethylene film, and most preferably a high-strength octene-type linear low density polyethylene film. Preferably, the film layer has a thickness in the range of about 4 to 12 mils. Alternately, film layer 112 comprises a closed-cell foam material.

In use, the film 112 is disposed on a side 114 of the article 100 which is intended to face wet or moist conditions or other environmental contaminants. A plurality of projections 116 are formed on the surface of film 112. The projections 116 are directional, extending from the side 114 toward the wet side environment and have a small pore or opening 116a therein which extends through the film 112. In this manner, when the projections 116 face a wet environment, they form a series of micro funnels or cones which allow air and acoustic energy to pass while repelling water and other contaminants.

The projections 116 may extend perpendicularly or, alternatively, at an angle with respect to the surface of the film 112. In the illustrated embodiment, the projections 116 are shown in a downwardly angled orientation which increases resistance to water inclusion. The projections 116 cover all or part (e.g., areas where sound absorption is most desired) of the surface of film 112. In one embodiment, the projections 116 are arranged in a regular pattern and can be formed by a number of perforation techniques. In a preferred embodiment, vacuum perforation techniques are used which produce raised bosses having perforated tips, as are generally known in the art. Other methods include, for example, hot or cold needle perforation techniques, and the like. The size and spacing of the projections 116 are such that they lend a degree of acoustic transparency to the film layer 112 while maintaining water resistance.

The porous protective film 112 can be laminated to the foam layer 110 using an adhesive. The adhesive can be applied in a continuous layer or, more preferably, in a an adhesive pattern for increased acoustic absorption, such as around the perimeter of the finished article. Other bonding techniques are also contemplated so long as it does not result in debossing the projections 116.

Referring now to FIG. 2, there is shown a sound-absorbing water shield 200 formed in accordance with a second embodiment of the present invention wherein like reference numerals are as described above by way of reference to FIG. 1, and further comprising a continuous, imperforate plastic film layer 210 disposed opposite the perforated film 112 on foam layer 110. The film layer 210, which may be formed of the same or a different material as the perforated film 112, is laminated to foam layer 110, e.g., using an adhesive. Layer 210 can be applied before layer 112, and in such cases, other conventional techniques for bonding the imperforate layer 210 and foam layer 110 can be used, such as flame bonding, heat lamination, and the like. The embodiment of FIG. 2 is advantageous in that the imperforate layer 210, which lacks the acoustic transparency of the perforate film layer 112, further assists in trapping acoustic energy in the core foam material.

Referring now to FIG. 3, there is shown a sound-absorbing water shield 300 formed in accordance with a third embodiment of the present invention wherein like reference numerals are as described above by way of reference to FIGS. 1 and 2, and further including sealed encasing film layers 310 and 312 extending around the perimeter of the article 300. Film layers 310 and 312 can comprise separately formed members or, alternatively, can be integrally formed with film layers 210 and 112, respectively. In this manner, the foam layer 110 is sealed on all sides against water and other contaminants entering therein.

Figure 5:
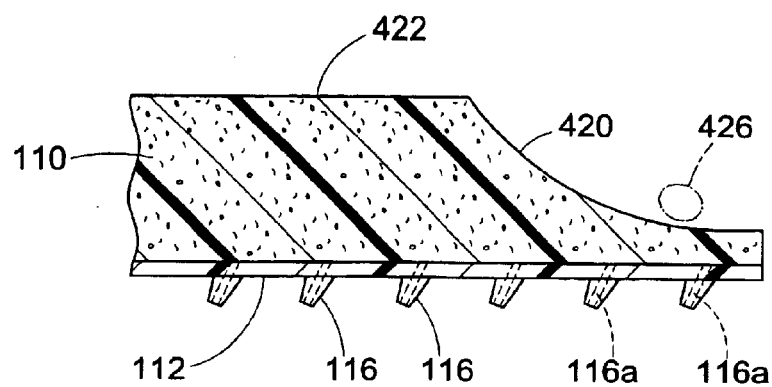
FIG. 5 is a cross-sectional view through the peripheral edge of the water deflector taken along lines 5—5 of FIG. 4.
Figure 6:
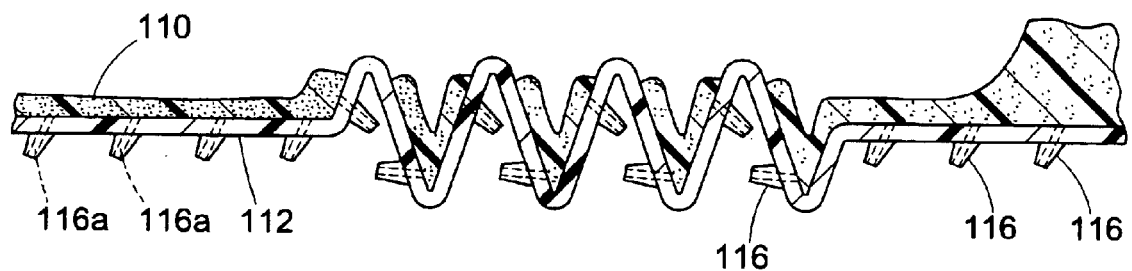
FIG. 6 is a cross-sectional view taken along lines 6—6 of FIG. 4.

Referring now to FIGS. 4–6, a sound-absorbing water deflector sheet 400 of the present invention is shown which is particularly intended for use in a vehicle door construction to protect the door trim panel from water, and to also cover and overlie certain door mounted components, such as speakers, window and door electric switch mechanisms, and the like. The peripheral shape of the protector in FIG. 4 is merely exemplary and this shape is selected and designed SO that it overlies and totally covers those portions of the inner door panel through which water might enter from within the door. The peripheral shape can vary significantly, but generally comprises an upper edge portion 412, a lower edge portion 414, and end edges 416 and 418. Various openings for the passage of wires and the like are often formed through the water deflector sheet.

The particular structure of the deflector sheet 400 comprises a two-layer composite or laminate, substantially as described in FIG. 1, including a foam layer 110 attached to a perforate film layer 112, and further including regions having different thicknesses. As shown in FIGS. 4 and 5, a region 420 of reduced foam thickness is advantageously formed around the periphery of the shield 400 while central region 422 retains increased foam thickness for increased sound absorption. Since wicking of water by the foam member 110 is most likely to occur at the peripheral edges, removal of the porous material from the periphery minimizes the uptake of water into the foam, thus reducing possible mildew and leakage problems. Foam is also advantageously removed at other possible wicking areas or areas of potential water entry, such as where wires, fasteners, hardware, and the like, pass through the deflector 400.

Additional regions of thin foam can also be provided for ease of assembly and installation. Referring now to FIGS. 4 and 6, it is often desirable to provide the deflector sheets with laterally deflectable pocket areas to allow the sheets to better conform to various structures and surfaces within the door, such as loud speakers, door handles, and the like. In the illustrated embodiment, region 424 of FIG. 4 comprises a laterally deflectable pocket formation. The deflectable pockets can be mechanically produced in the manner of commonly assigned U.S. Pat. Nos. 4,696,848, 4,865,791, and 5,560,967, the entire contents of which are incorporated herein by reference. Briefly, the deflectable pocket is produced by mechanically deforming the sheet using interengaging closely spaced blade-like members so as to stretch the areas between the edges of the inner penetrating tools to form a series of pleats.

Preferably, the stretching of the film layer 112 is sufficient to fracture or tear the foam 110 layer in the area between the highly stretched portions of the film, with the foam remaining attached to the pleats.

Depending on the desired configuration, other various openings can be formed through the water deflector sheet, such as various holes, slits, perforations, etc., provided for the passage of wires, screws or other fasteners, handles, and the like. Such regions and are advantageously regions having a thin foam layer 110. The removal of foam in regions such as region 424 or other regions provides an additional advantage in that a thin foam layer formed by cutting or other means for material removal, unlike compressed foam, may be made sufficiently thin so as to allow the passage of light, thus making it easier to locate fasteners and the like during installation.

Regions of variable thickness in the foam layer can be formed using a compression cutting technique. In this manner, the foam thickness can be varied in any configuration from full thickness down to near zero. The sheet is compressed between a smooth roller and a profiled roller or plate to selectively compress the foam different amounts in different regions. A cutting blade is positioned to cut the foam just as it exits the nip. In this manner, the regions that are compressed are not cut or are minimally cut and the uncompressed areas are cut more deeply. If a transparent film is used, the thin foam areas produced are nearly transparent or otherwise allow sufficient passage of light to provide the attendant assembly advantages mentioned above. Since no heat is involved, the process is rapid and relatively inexpensive.

The pocket forming section 424 can be formed before or after the water deflector sheet 400 has been cut to its desired peripheral size and configuration, however, it is normally done prior to cutting the sheet to size because of the need for the edge portions of the sheet for gripping and holding during the pocket forming operation. Likewise, laminated blanks are preferably compression cut with peripheral waste areas left at full foam thickness. The sheets can then be die cut in the conventional fashion. The sheets can also be stacked into pads for processing before or after they are cut to shape. For mounting and installation, a bead-type adhesive, such as a pressure-sensitive adhesive, or sealer is applied to the door or, alternately, the adhesive is applied to the periphery or various other locations of the shield 400, as desired.

Referring to FIGS. 4 and 5, there is shown in phantom an optional adhesive bead 426 applied to the periphery prior to installation. In a preferred embodiment, a film release coating, such as a silicone-based release agent or the like, is applied to surface of film 112 to allow preapplication of adhesive 426 and subsequent stacking of the shields for processing. Preferably, the release coating is applied to the exposed film side prior to laminating the film and foam layers.

Figure 7:
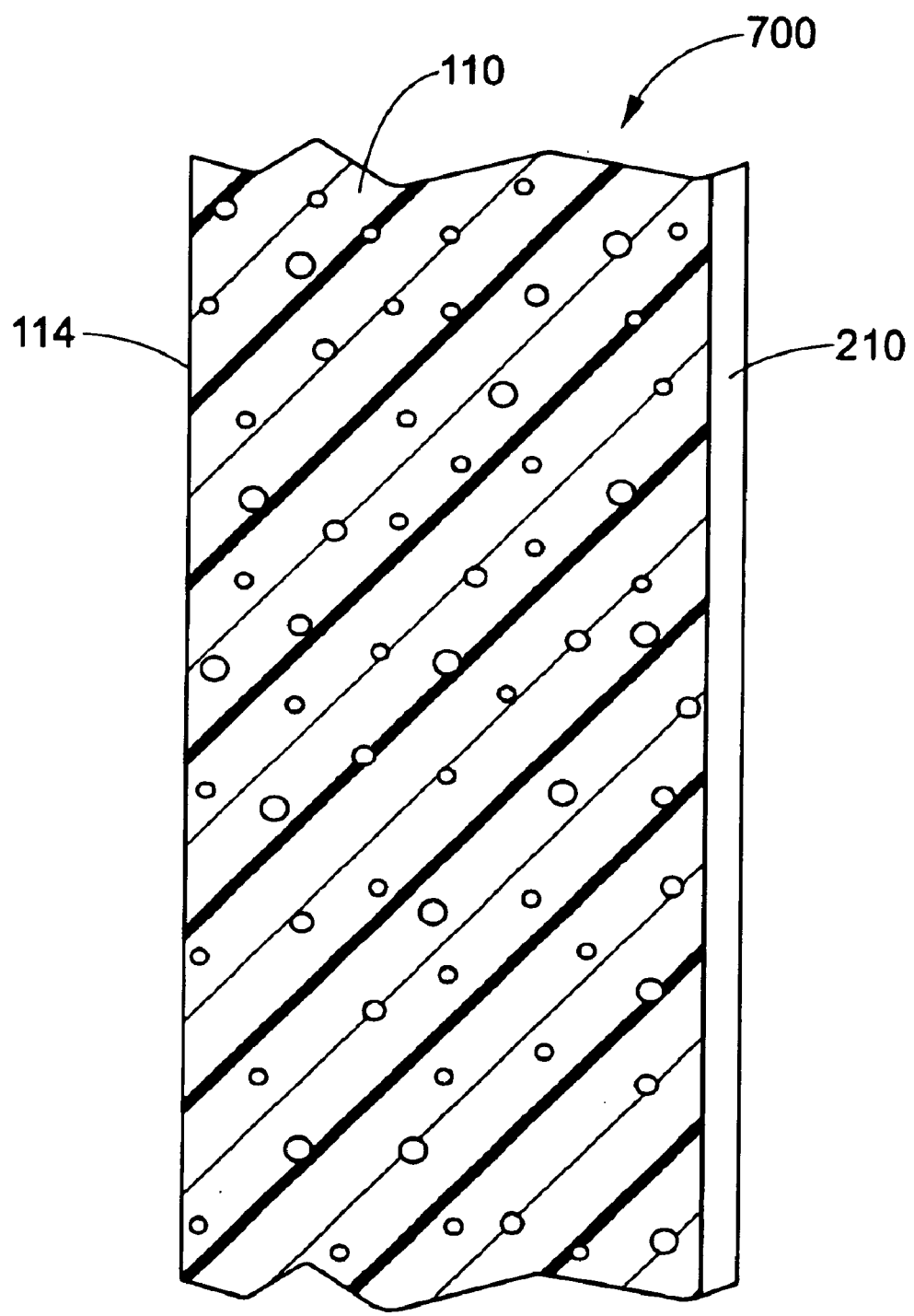
FIG. 7 is a side sectional view of a sound-absorbing water deflector sheet construction formed in accordance with a further embodiment of the present invention.

Referring now to FIG. 7, a further embodiment of the present invention is illustrated. A sound-absorbing water shield 700 comprises an open- or closed-cell foam layer 110, preferably an open-cell foam layer, laminated to an imperforate film layer 210. Exposed open-cell foam layer 110 is disposed on water-facing side 114 of the shield 700. With exposed foam facing the outside of the vehicle, the effectiveness of the shield in absorbing sound may be further enhanced. In a preferred embodiment, the foam layer 110 comprises a hydrophobic foam which has a significantly reduced tendency to absorb water, thereby avoiding leakage and mildew problems.

The invention has been described with reference to the preferred embodiments. Obviously, modifications and alterations will occur to others upon a reading and understanding of this specification. The forms hereinbefore described being merely explanatory and exemplary, it is intended that the invention be construed as including all such modifications and alterations insofar as they come within the scope of the appended claims or the equivalents thereof.

What is claimed is:

1. A sound-absorbing shield device for use in a vehicle door, comprising:

a sheet of sound-absorbing material;

a thin sheet of polymer film having a first face attached to a first face of the sound absorbing material and having a second face of said sound absorbing material;

a plurality of projections extending through the polymer film from the first face thereof to said second lace thereof;

each of said projections having an opening extending therethrough from said first face, of said sound absorbing material the projections and openings cooperating to form a barrier against environmental contamination while admitting acoustic energy therethrough.

2. The shield device of claim 1, wherein the sound-absorbing material is a foam material.

3. The shield device of claim 1, wherein the sound-absorbing material is an open-cell foam material.

4. The shield device of claim 1, wherein the sound absorbing material is a polyurethane foam material.

5. The shield device of claim 1, wherein the polymer film is a polyethylene film.

6. The shield device of claim 1, further comprising an imperforate polymer film attached to a second side of said sound-absorbing sheet opposite the first side thereof.

7. The shield device of claim 6, further comprising a polymer film sealing a peripheral edge of said sound-absorbing sheet, said peripheral edge transverse to the first and second faces of the sound-absorbing sheet.

8. The shield device of claim 1, further comprising an adhesive attached to a second side of said sound-absorbing sheet opposite said first side.

9. The shield device of claim 8, further comprising a protective sheet removably engaging said adhesive.

10. The shield device of claim 1, wherein said sheet of sound-absorbing material has a variable thickness.

11. The shield device of claim 1, wherein said sheet of sound absorbing material comprises a sheet of foam having a region of reduced foam thickness.

12. The shield device of claim 11, wherein said region of reduced foam thickness is located at a peripheral edge of the shield device.

13. The shield device of claim 11, wherein the region of reduced foam thickness overlies an opening formed in the polymer film.

14. The shield device of claim 11, wherein the region of reduced foam thickness overlies a laterally deflectable pocket formed in the polymer film.

15. The shield device of claim 11, wherein the region of reduced foam thickness is formed by cutting.

16. The shield device of claim 15, wherein the region of reduced foam thickness is sufficiently thin to allow the passage of light.

17. In a vehicle door construction having an outer door panel and an inner door panel with a trim panel joined to the inner door panel, and a shield device positioned between the trim panel and the inner door panel, the improvement wherein the shield device comprises:

a sheet of sound-absorbing material;

a thin sheet of polymer film having an inboard facing surface and an outboard facing surface, said inboard facing surface being attached to an outboard facing surface of the sound absorbing material;

a plurality of openings extending through the polymer film from the inboard facing surface thereof to said outboard facing surface of the film;

each opening extending through each of a plurality of projection extending from said outboard facing surface, the openings and projections cooperating to form a barrier against environmental contamination while admitting acoustic energy therethrough.

18. In the vehicle door construction as defined in claim 17, the improvement further wherein said projections extend outwardly from said outboard facing film surface at an angle which is less than or equal to horizontal when said shield device is installed in a vertical operating position.

* * * * *